(12) United States Patent
Purcell (10) Patent No.: US 6,863,524 B2
(45) Date of Patent: Mar. 8, 2005

(54) FUEL PRE-HEATING DEVICE (76) Inventor: Brent Purcell, P.O. Box 502, Orange, VA (US) 22960

( * ) Notice: Subject to any disclaimer, the term of this patent is extended or adjusted under 35 U.S.C. 154(b) by 35 days.

(21) Appl. No.: 10/285,104

(22) Filed: Oct. 31, 2002

(65) Prior Publication Data
US 2003/0145846 A1 Aug. 7, 2003

Related U.S. Application Data
(60) Provisional application No. 60/336,384, filed on Oct. 31, 2001.

(51) Int. Cl.[7] ................................................ F23L 15/00
(52) U.S. Cl. ..................... 431/11; 431/247; 431/248; 431/103
(58) Field of Search .......................... 431/11, 247, 248, 431/244, 245, 103, 105

(56) References Cited
U.S. PATENT DOCUMENTS

| | | | | |
|---|---|---|---|---|
| 476,694 A | * | 6/1892 | Smith | 431/247 |
| 1,438,314 A | * | 12/1922 | Kornfeld | 431/105 |
| 1,450,530 A | * | 4/1923 | Watkins | 431/247 |
| 3,877,458 A | * | 4/1975 | Allander | 126/44 |
| 6,290,487 B1 | * | 9/2001 | Velke | 431/11 |

* cited by examiner

Primary Examiner—Jiping Lu
(74) Attorney, Agent, or Firm—Jagtiani & Guttag

(57) ABSTRACT

A fuel pre-heating device for use with gas heaters to increase fuel efficiency including an orifice and a pre-heat tube. Fuel enters the device through the orifice and travels through the pre-heat tube and back to the orifice where it is then expelled and mixed with air to ignite into a flame that envelopes the entire pre-heat tube and heats the fuel within the lube to a very high temperature. Any air mixer known to those skilled in the art can be used with the heating tube. A heat conductor can also be used with the pre-heat tube. The pre-heating device can be easily added to standard heaters, is small in configuration, and inexpensive to manufacture. The small size of the heating tube allows for immediate preheating of the fuel, which is used by the heater in the same heating cycle, thereby yielding a more efficient preheat. This pre-heating system prevents the fuel from being wasted.

15 Claims, 8 Drawing Sheets

TEST ROOM TEMP
DATE 07/19/01
ORIFICE - .057 (LARGE)
OUR BURNER
CLOUDY/OVERCAST
FUEL SAVINGS - 10%

| TIME | FUEL WEIGHT | ORF TEMP | A | B | C |
|---|---|---|---|---|---|
| START | 27.225 | | 79 | 79 | 79 |
| 1 | | | | | |
| 2 | 27.200 | 150 | 81 | 81 | 81 |
| 3 | | | | | |
| 4 | 27.180 | 160 | 83 | 83 | 82 |
| 5 | | | | | |
| 6 | 27.155 | 150 | 84 | 83 | 83 |
| 7 | | | | | |
| 8 | 27.130 | 130 | 83 | 82 | 82 |
| 9 | | | | | |
| 10 | 27.105 | 120 | 84 | 82 | 82 |
| TOTAL | .120 | | +5 | +3 | +3 |

TEST ROOM TEMP
DATE 07/19/01
ORIFICE - .046
AMERICAN STANDARD BURNER

| TIME | FUEL WEIGHT | ORF TEMP | A | B | C |
|---|---|---|---|---|---|
| START | 27.330 | | 79 | 79 | 79 |
| 1 | | | | | |
| 2 | 27.356 | | 79 | 80 | 79 |
| 3 | | | | | |
| 4 | 27.325 | | 81 | 81 | 81 |
| 5 | | | | | |
| 6 | 27.300 | | 81 | 80 | 81 |
| 7 | | | | | |
| 8 | 27.275 | | 81 | 81 | 81 |
| 9 | | | | | |
| 10 | 27.247 | | 81 | 81 | 81 |
| TOTAL | .183 | | +2 | +2 | +2 |

FIG. 6

TEST ROOM TEMP
DATE 07/18/01
ORIFICE -.052
OUR BURNER
CLOUDY/OVERCAST
FUEL SAVINGS - 36%

SHOP ROOM
24' x 48' (12' ceiling)
WALL TEMPS
BATH
FURNACE

| TIME | FUEL WEIGHT | ORF TEMP | | A | B | C |
|---|---|---|---|---|---|---|
| START | 27,435 | | | 79 | 79 | 79 |
| 1 | | | | | | |
| 2 | 27,415 | 180 | | 80 | 79 | 80 |
| 3 | | | | | | |
| 4 | 27,400 | 191 | | 80 | 80 | 80 |
| 5 | | | | | | |
| 6 | 27,380 | 215 | | 81 | 80 | 81 |
| 7 | | | | | | |
| 8 | 27,355 | 226 | | 82 | 81 | 82 |
| 9 | | | | | | |
| 10 | 27,350 | 230 | | 82 | 81 | 81 |
| TOTAL | .085 | | | +3 | +2 | +2.5 |

TEST ROOM TEMP
DATE 07/18/01
ORIFICE -.044
AMERICAN STANDARD BURNER

SHOP ROOM
24' x 48' (12' ceiling)
WALL TEMPS
BATH
FURNACE

| TIME | FUEL WEIGHT | ORF TEMP | | A | B | C |
|---|---|---|---|---|---|---|
| START | 27,390 | | | 79 | 79 | 79 |
| 1 | | | | | | |
| 2 | 27,356 | | | 79 | 80 | 79 |
| 3 | | | | | | |
| 4 | 27,325 | | | 81 | 81 | 81 |
| 5 | | | | | | |
| 6 | 27,300 | | | 81 | 80 | 81 |
| 7 | | | | | | |
| 8 | 27,275 | | | 81 | 81 | 81 |
| 9 | | | | | | |
| 10 | 27,247 | | | 81 | 81 | 81 |
| TOTAL | .133 | | | +2 | +2 | +2 |

American Standard

Test: Heat/Fuel
Date: 07-02-01
.046 orifice
wood partition

PLENTUM: D (top-left), B (top-right), A (bottom-left), C (bottom-right); BP-PLEN

| Time | Fuel Weight | ORF TEMP | A | B | C | D |
|---|---|---|---|---|---|---|
| Start | 22.065 | | 78 | 78 | 78 | 78 |
| 1 | .050 | | 79 | 79 | 78 | 79 |
| 2 | .035 | | 79 | 79 | 79 | 80 |
| 3 | .025 | | 81 | 81 | 80 | 82 |
| 4 | .015 | | 81 | 81 | 80 | 82 |
| 5 | 21.000 | | 82 | 81 | 80 | 82 |
| 6 | .990 | | 82 | 81 | 80 | 82 |
| 7 | | | 82 | 81 | 81 | 83 |
| 8 | | | 84 | 81 | 81 | 83 |
| 9 | | | 83 | 82 | 82 | 84 |
| 10 | .935 | | 83 | 82 | 81 | 84 |
| Total | .130 | | +5 | +4 | +3 | +6 |

Present Invention

Test: Heat/Fuel
Date: 07-02-01
.052 orifice 1¼ air mix
wood partition

PLENTUM: D (top-left), B (top-right), A (bottom-left), C (bottom-right); BP-PLEN

| Time | Fuel Weight | ORF TEMP | A | B | C | D |
|---|---|---|---|---|---|---|
| Start | 20.155 | | 79 | 79 | 79 | 79 |
| 1 | .150 | | 79 | 80 | 79 | 80 |
| 2 | .140 | | 80 | 80 | 79 | 80 |
| 3 | | | 80 | 80 | 79 | 80 |
| 4 | .120 | | 80 | 81 | 80 | 81 |
| 5 | | | 81 | 81 | 80 | 81 |
| 6 | .105 | | 81 | 82 | 80 | 82 |
| 7 | .095 | | 82 | 81 | 81 | 83 |
| 8 | .085 | | 82 | 82 | 81 | 83 |
| 9 | | | 83 | 82 | 81 | 83 |
| 10 | .070 | | 84 | 82 | 81 | 84 |
| Total | .085 | | +5 | +3 | +2 | +5 |

FIG. 9

FUEL PRE-HEATING DEVICE

The present invention is generally directed to a fuel pre-heating device, and specifically to a fuel pre-heating device for use with gas heaters to increase fuel efficiency. Priority is claimed to U.S. Provisional Application No. 60/336,384, filed on Oct. 31, 2001.

BACKGROUND OF INVENTION

Gas heaters are extremely popular heating devices. Gas heaters are now safe, environmentally friendly, and economically sensible. However, a problem with gas heaters is that not all gas is burned by the heaters, and, therefore, much gas is simply wasted. There is potential for gas heaters to be more fuel-efficient.

One method for increasing fuel efficiency is pre-heating fuel. Previous fuel pre-heating mechanisms include running fuel through a long coiled tube that forms a cylinder. A flame is shot through the hollow center of the coiled cylinder which heats the fuel inside the tube. While this device does pre-heat the fuel, the device itself is expensive to manufacture and cannot be made into a small configuration. Other pre-heating mechanisms heat the tube, but specifically protect the tubes in order to prevent the tubes from getting extremely hot. Still other pre-heating devices heat the fuel but then allow a cooling off period before the fuel is actually used by the heater.

SUMMARY OF INVENTION

The present invention discloses a fuel pre-heating device for use with gas heaters to increase fuel efficiency that can be made into a small configuration and is inexpensive to manufacture. The fuel pre-heating device of the present invention comprises an orifice and a pre-heat tube. The pre-heating device can be easily added to standard heaters. The fuel enters the device through the orifice and travels through the pre-heat tube and back to the orifice where it is then expelled. Upon exit from the orifice and tube, the fuel mixes with air and forms a flame that envelopes the entire pre-heat tube and heats the fuel within the tube to a very high temperature. Any air mixer known to those skilled in the art can be used with the heating tube. A heat conductor can also be used with the pre-heat tube.

The small size of the heating tube allows for immediate preheating of the fuel, which is used by the heater in the same heating cycle, thereby yielding a more efficient pre-heat. This preheating system prevents the fuel from being wasted. The fuel efficiency improvement using a gas burner equipped with the pre-heating device of the present invention is in the range of 10–36% over the standard gas heater.

DETAILED DESCRIPTION OF INVENTION

The fuel pre-heating device 1 of the present invention comprises an orifice 10 and a pre-heat tube 20. The pre-heating device is easily added to standard heaters that use natural gas, propane, or other low carbon fuel by simply removing the standard fuel exit orifice and attaching the orifice of the pre-heating device.

Figure 1:
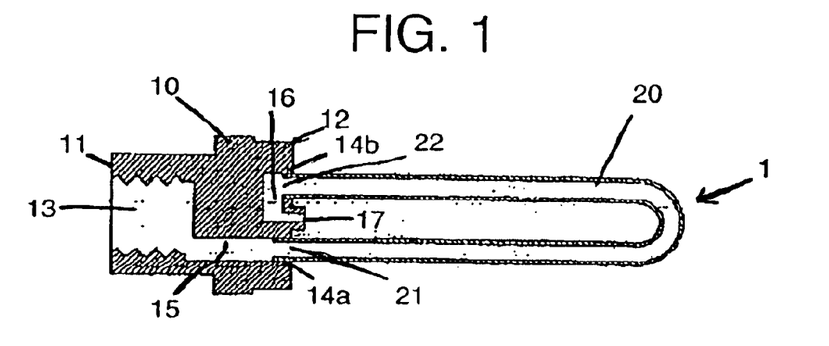
FIG. 1 is a vertical cross-section through the center of the fuel preheating device.

As shown in FIG. 1, orifice 10 has a first end 11 and second end 12. First end 11 has a threaded recess 13 for connecting to a heater, and second end 12 has attachment points 14a and 14b for receiving pre-heat tube 20. Attachment point 14a receives first end 21 of pre-heat tube 20 while attachment point 14b receives second end 22 of pre-heat tube 20. Fuel enters fuel pre-heating device 1 at recess 13 and flows through cavity 15 of orifice 10 and into first end 21 of pre-heat tube 20 as shown in FIG. 1. The fuel flows through the entire pre-heat tube 20 and back into second end 12 of orifice 10 where it is forced through cavity 16 and out of orifice 10 at opening 17.

Figure 2:
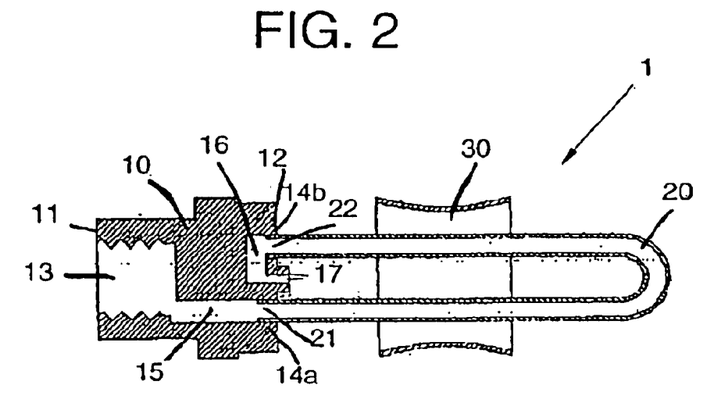
FIG. 2 is a vertical cross-section through the center of the fuel pre-heating device with an air mixer.
Figure 3:
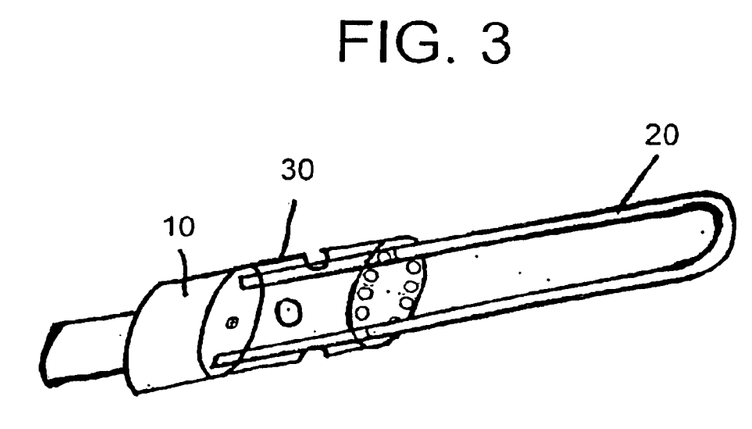
FIG. 3 is a schematic view of the fuel pre-heating device with an air mixer attached.

Upon exit from pre-heat tube 20 and orifice 10, the fuel mixes with air and ignites to form an extremely hot flame. This flame envelopes the entire pre-heat tube 20 and rapidly heats the fuel running through the tube at that point to a very high temperature. This high temperature is reached quickly because the entire pre-heat tube is engulfed in the flame. In the preferred embodiment an air mixer 30 is attached to fuel pre-heating device 1, preferably surrounding the pre-heat tube as shown in both of FIGS. 2 and 3. Any of the air mixers known to one skilled in the art can be used with the heating tube. The exact configuration of the air mixer is not narrowly critical to the present invention.

Pre-heat tube 20 is preferably a u-shaped tube made of stainless steel. However, numerous materials and shapes that will be obvious to those skilled in the art can be used make the tube depending on the application of the tube and the fierceness of the flame used to heat the fuel. However, it is important that the heating tube be of such a configuration so that the flame can envelope the entire tube.

The fuel enters first end 21 of pre-heat tube 20 from second end 12 of orifice 10 and travels through pre-heat tube 20 and out second end 22 where it enters air mixer 30. No air is present inside pre-heat tube 20 and the fuel is not mixed with air until it exits opening 17 into the air mixer. The flame emerging from pre-heat tube 20 totally envelopes the tube and quickly heats the fuel inside the tube to a very high temperature. The tube is preferably heated to a temperature of 450°–800° F. The pre-heated, air-mixed fuel is not given a cooling off period but is directly ready to generate heat.

The fuel pre-heating device of the present invention is advantageous over other pre-heating apparatus because it is smaller and less expensive to manufacture. The small size of the heating tube allows for immediate preheating of the fuel, which is used by the heater in the same heating cycle. This immediate preheating prevents the effect of heating the fuel from being lost during cycling of the heater, thereby yielding a more efficient preheat. The preheating system of the present invention allows the highly heated fuel to be used by the heater, not wasted.

Figure 4:
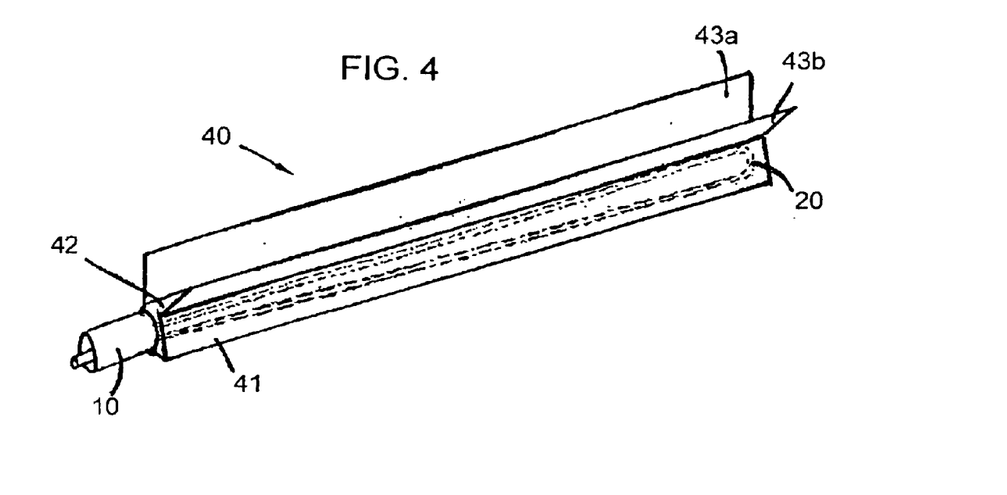
FIG. 4 is a schematic view of the preferred heat conductor.

In some applications, such as clothes dryers, a heat conductor 40 is used as shown in FIG. 4. When a heat conductor is used, the pre-heat tube extends through conductor 40 where it is heated by flames. Heat conductor 40 preferably has a triangular base 41 with an open slat 42 at the top point of the base, from which extend two plates 43a and 43b at 45-degree angles. Heat conductor 40 is preferably made of a metallic material, preferably sheet metal. The base serves as the heat source. The heat is directed from base 41 through open slat 42 and plates 43a and 43b by airflow. The sides and bottom of the conductor also release heat.

The preheating device of the present invention yields great improvement in fuel efficiency. Tests have shown fuel efficiency improvement of as much as 36% compared to current gas heaters not using a preheating apparatus. These test results are set forth in FIGS. 5, 6, 7, and 8.

Figure 5:
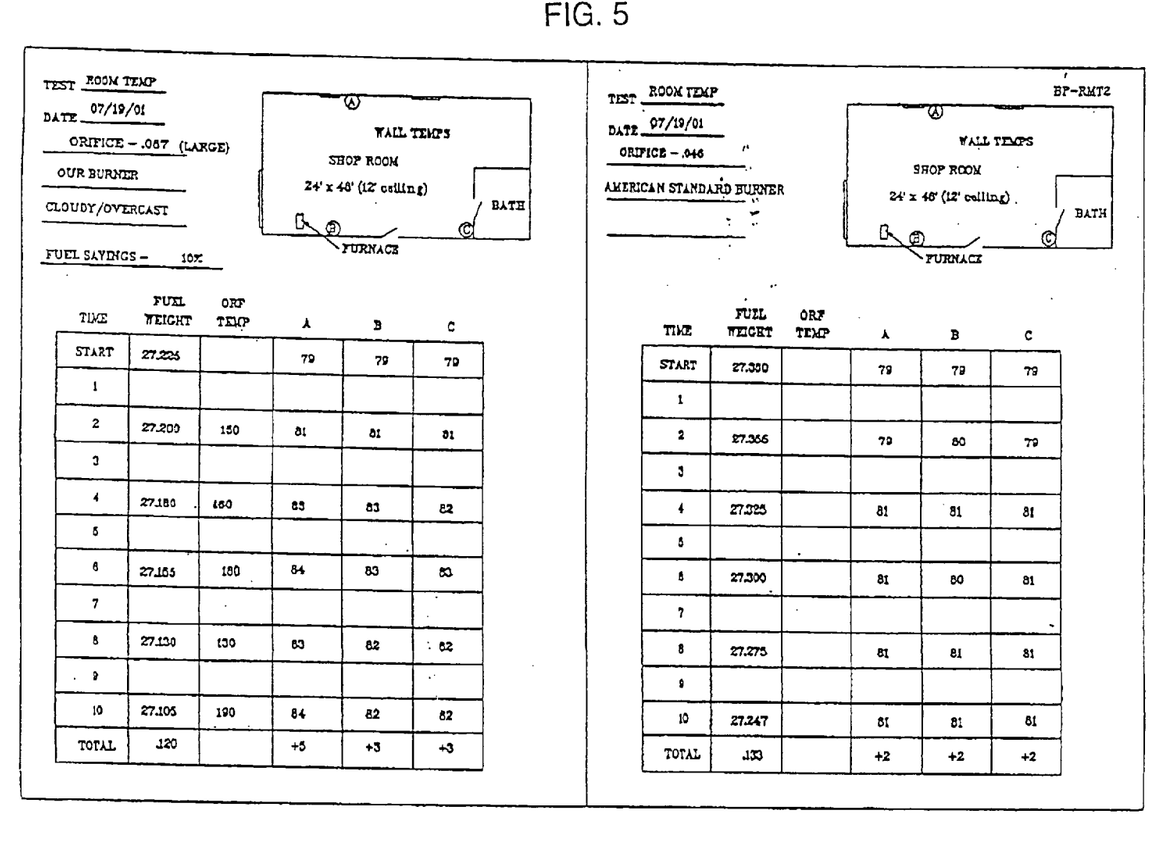
FIG. 5 is a chart of comparative room test results.

In the test shown in FIG. 5, a standard gas burner was used having an orifice size of 0.045 and a gas burner equipped with the preheating device of the present invention was used having an orifice of 0.052. The starting fuel weight in the standard gas burner was 27.380 and the starting room temperature was 79 degrees. Temperature measurements were taken at points A, B, and C in a shop room. Measurements were made at one-minute intervals for ten minutes. The fuel weight at the end of the ten-minute time period was 27.247 while the temperature was 81 degrees at each point A, B, and C. The starting fuel weight in the gas burner equipped with the pre-heating device was 27.435 and the starting room temperature was 79 degrees. Temperature measurements were taken at one-minute intervals for ten minutes at points A, B, and C in a shop room. The fuel weight at the end of the ten-minute time period was 27.350 while the temperature was 82 degrees at point A, 81 degrees at point B, and 81 degrees at point C. This test yielded a fuel savings of 36% in the gas burner equipped with the pre-heating device of the present invention. This increased efficiency could be attributed to the increase in the volume of gas caused by heating the gas to extremely high temperatures, thereby allowing a better mixture of gas and air. Because the high heat yields increased gas volume and therefore less fuel per cubic foot, logic dictates that heating the fuel to maximum temperature should not increase fuel efficiency; however, the results of the present invention reveal that this high pre-heating indeed does increase fuel efficiency.

Figure 6:
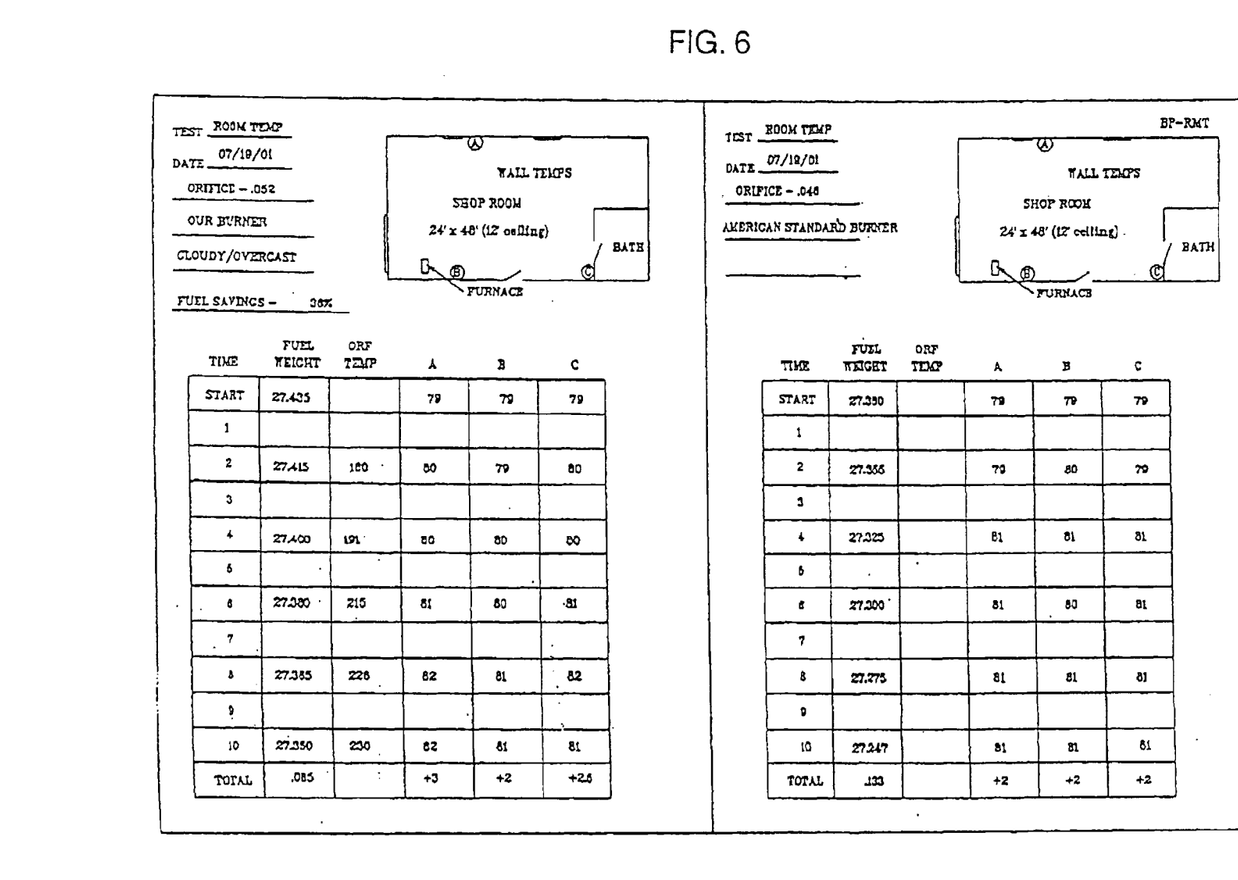
FIG. 6 is a chart of comparative room test results.
Figure 7:
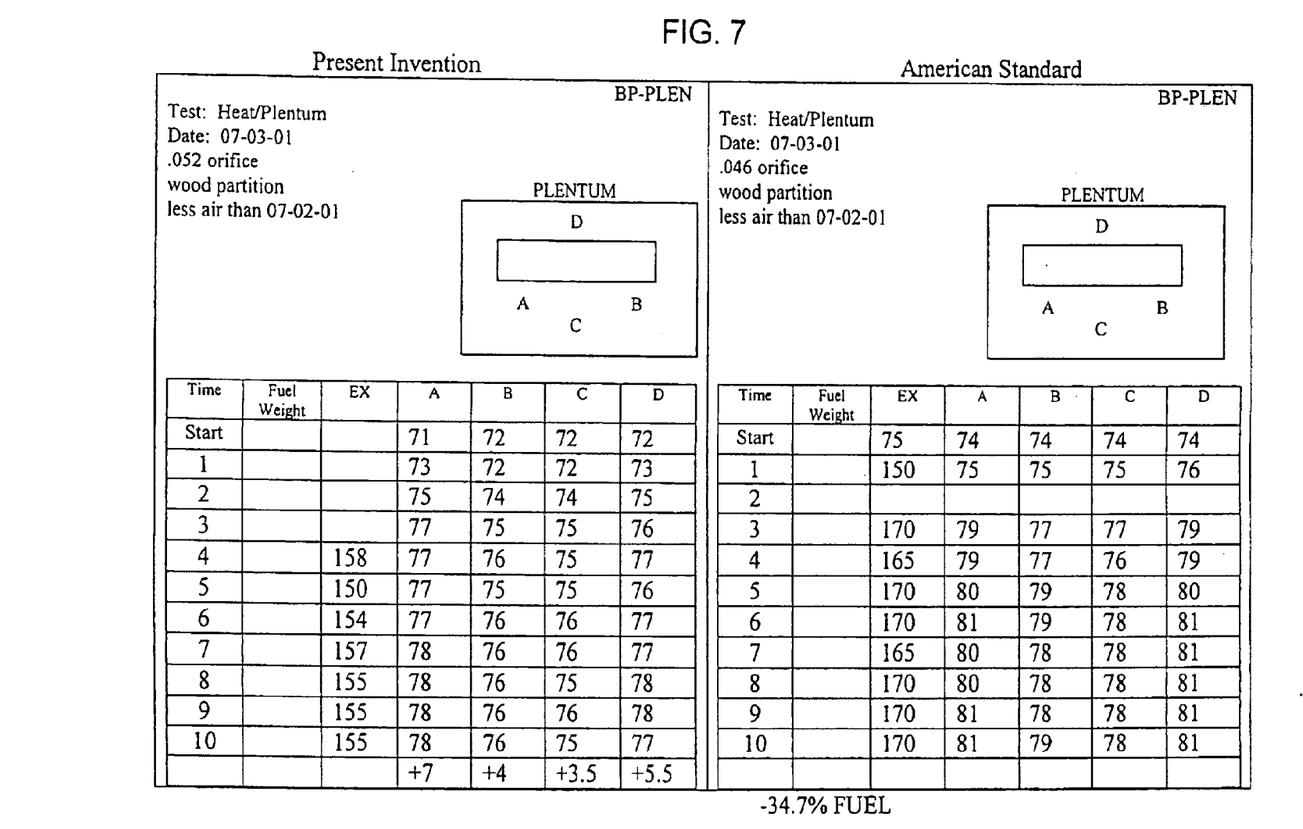
FIG. 7 is a chart of comparative plenum test results.
Figure 8:
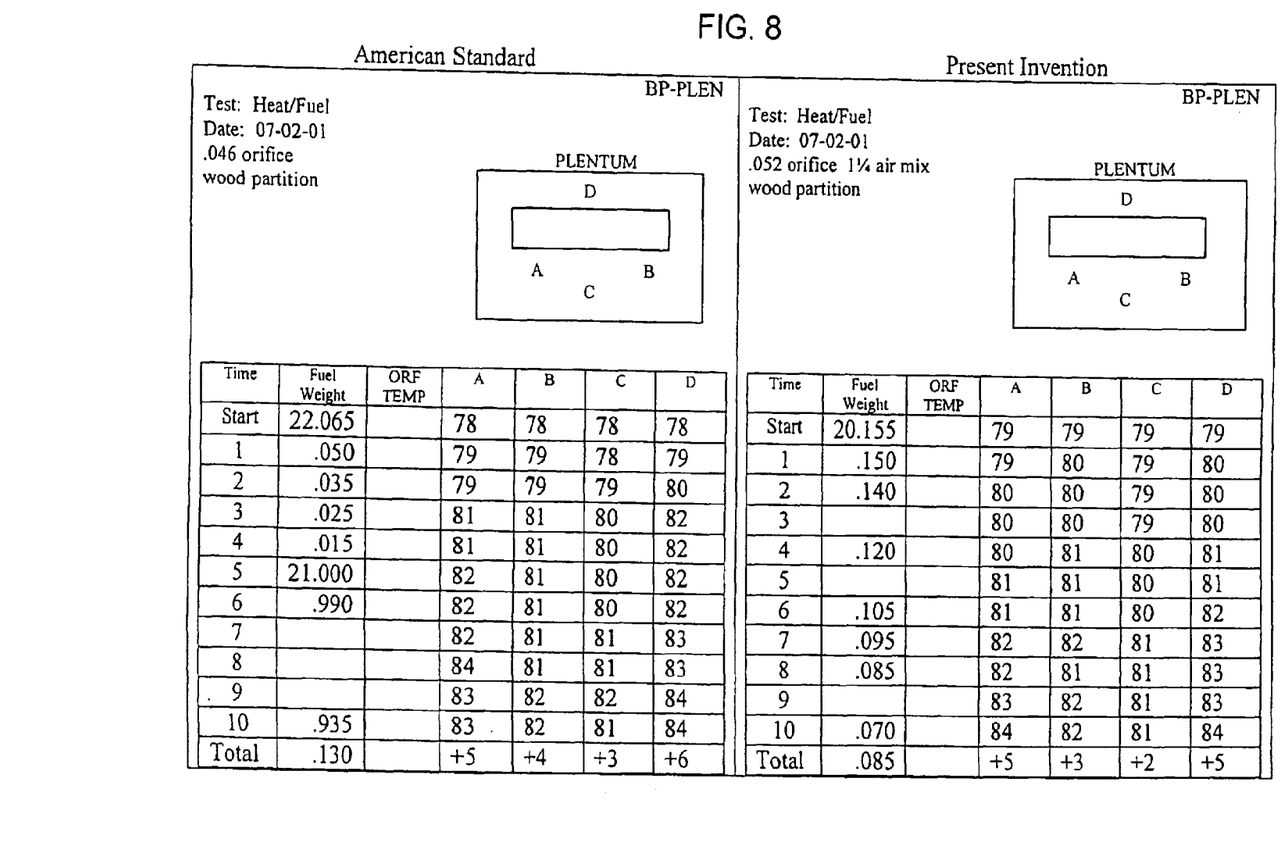
FIG. 8 is a chart of comparative plenum test results.

The other tests shown in FIGS. 6, 7, and 8 were conducted using the same method as described in FIG. 5 above with only slight changes. In FIG. 6 a larger orifice was used in the gas burner equipped with the pre-heating device. This test yielded a fuel savings of 10% over the standard gas burner and provided a higher temperature in the room than the standard gas burner. In FIGS. 7 and 8, temperature measurements were taken at four points in around a plenum. These measurements were taken to verify that the temperature of the air coming out of the plenum was relatively the same as the room temperature. Each test of FIGS. 7 and 8 yielded a fuel savings of 34.7%. As shown in the figures, the fuel improvement using the gas burner equipped with the pre-heating device of the present invention ranged from 10–36% over the standard gas heater.

Figure 9:
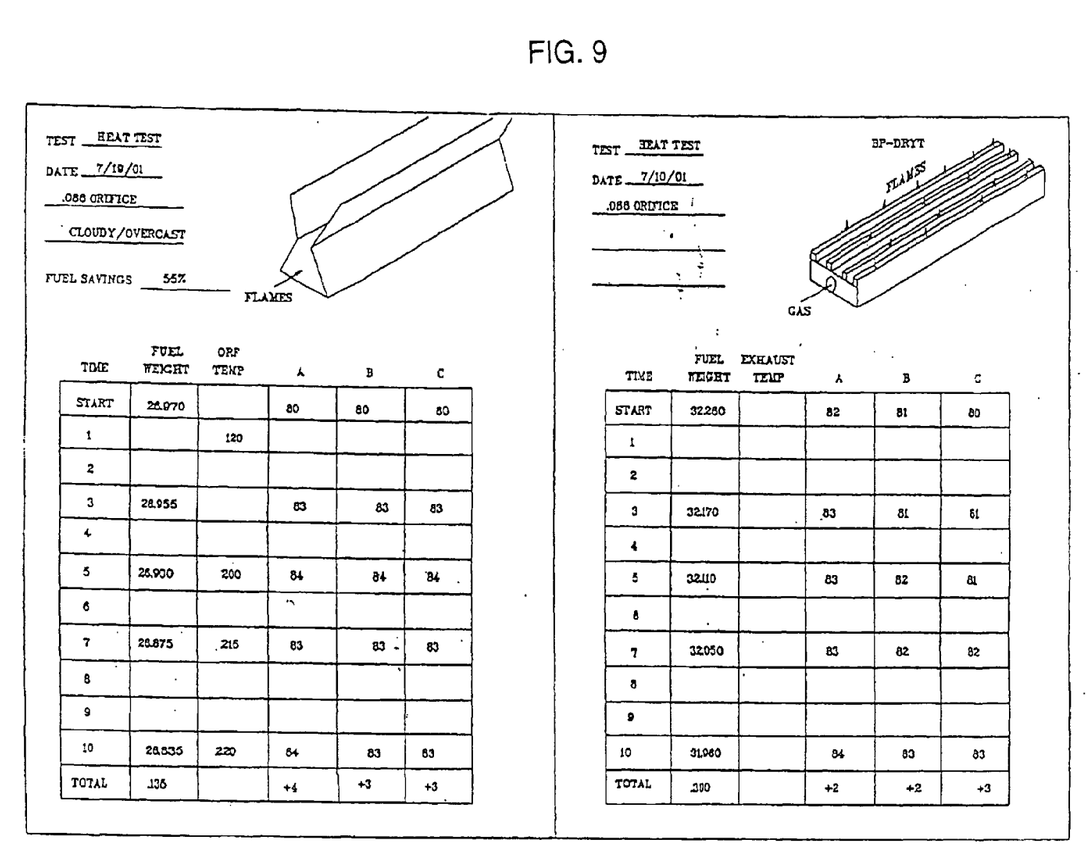
FIG. 9 is a chart of comparative dryer test results.

Further, FIG. 9 shows test data from a comparison of a dryer using the pre-heating device of the present invention with a heat conductor versus using the standard gas dryer. As can be seen from the tests, the pre-heating device of the present invention yielded 55% better fuel savings over the standard dryer.

What is claimed is:

1. A fuel pre-heating device comprising:
    an orifice having a first end and second end, said first end containing at least one recess and said second end containing at least one opening;
    a first cavity within said orifice, said first cavity continuously connected to said at least one recess;
    a second cavity within said orifice, said second cavity continuously connected to said at least one opening of said orifice,
    a tube having a first end and a second end, said first end of said tube continuously connected to said first cavity at said second end of said orifice, said second end of said tube continuously connected to said second cavity at said second end of said orifice;
    wherein fuel exiting said second end of said orifice mixes with air to form a flame; and
    wherein said flame envelopes the entirety of said tube and heats said fuel within said tube.

2. The fuel pre-heating device of claim 1, further comprising an air mixer surrounding said tube of said pre-heating device.

3. The fuel pre-heating device of claim 1, wherein said tube is U-shaped.

4. The fuel pre-heating device of claim 1, wherein said tube is made of stainless steel.

5. The fuel pre-heating device of claim 1 wherein said fuel is heated to a temperature within the range of 450–800 degrees Fahrenheit.

6. The fuel pre-heating device of claim 1 further comprising a heat conductor, wherein said tube extends through said conductor.

7. The fuel pre-heating device of claim 6 wherein said heat conductor is a metallic material.

8. A fuel pre-heating device for increasing the fuel efficiency of a gas heater comprising:
    an orifice having a first end and second end, said first end containing at least one recess and said second end containing at least one opening;
    a first cavity within said orifice, said first cavity continuously connected to said at least one recess,
    a second cavity within said orifice, said second cavity continuously connected to said at least one opening of said orifice;
    a tube having a first end and a second end, said first end continuously connected to said first cavity at said second end of said orifice, said second end of said tube continuously connected to said second cavity at said second end of said orifice;
    an air mixer surrounding said tube of said pre-heating device;
    wherein fuel enters said pre-heating device at said at least one recess, flows through said first cavity of said orifice into said tube, flows through said tube into said second end of said orifice, where said fuel is forced through said second cavity of said orifice and out of said at least one opening of said orifice, wherein said fuel mixes with air inside said air mixer and ignites to form a flame; and
    wherein said flame envelopes the entirety of said tube and heats said fuel within said tube.

9. The fuel pre-heating device of claim 8 wherein said fuel is heated to a temperature within the range of 450–800 degrees Fahrenheit.

10. The fuel pre-heating device of claim 8, further comprising a heat conductor, wherein said tube extends through said conductor.

11. The fuel pre-heating device of claim 10, wherein said gas heater is a clothes dryer.

12. A method of increasing fuel efficiency in a gas heater comprising:
    attaching to said gas heater a fuel pre-heating device comprising:

an orifice having a first end and second end, said first end containing at least one recess and said second end containing at least one opening;

a first cavity within said orifice, said first cavity continuously connected to said at least one recess, a second cavity within said orifice, said second cavity continuously connected to said at least one opening of said orifice;

a tube having a first end and a second end, said first end of said tube continuously connected to said first cavity at said second end of said orifice, said second end of said tube continuously connected to said second cavity at said second end of said orifice;

forcing fuel into said pre-heating device at said at least one recess;

wherein said fuel flows through said first cavity of said orifice and into said tube, flows through said tube into said second end of said orifice, wherein said fuel is forced through said second cavity of said orifice and out of said at least one opening of said orifice, and wherein said fuel mixes with air to ignite and form a flame; and enveloping the entirety of said tube within said flame, thereby heating said fuel within said tube.

13. The method of claim 12, further comprising mixing said fuel with air within an air mixer surrounding said tube after said fuel is forced out of said at least one opening of said orifice of said pre-heating device.

14. The method of claim 12, further comprising directing heat produced by said pre-heating device in a particular direction using a heat conductor surrounding said tube.

15. The method of claim 12, wherein said fuel is heated to a temperature within the range of 450–800 degrees Fahrenheit.

* * * * *